United States Patent

Brooks et al.

[11] Patent Number: 5,803,463
[45] Date of Patent: Sep. 8, 1998

[54] GREASE SEAL

[75] Inventors: Clive A. Brooks; Kenneth G. Kakabaker, both of Kalamazoo, Mich.

[73] Assignee: Durametallic Corporation, Kalamazoo, Mich.

[21] Appl. No.: 704,964

[22] Filed: Aug. 29, 1996

[51] Int. Cl.⁶ .................................................. F16J 15/34
[52] U.S. Cl. ........................................... 277/361; 277/408
[58] Field of Search ................................ 277/58, 59, 65, 277/95, 72 FM, 73, 361, 408

[56] References Cited

U.S. PATENT DOCUMENTS

| | | | |
|---|---|---|---|
| 354,936 | 12/1886 | Rohn | 272/59 |
| 2,436,514 | 2/1948 | Jennings | 103/111 |
| 2,943,453 | 7/1960 | Jonkers et al. | 62/6 |
| 3,051,497 | 8/1962 | Wigg et al. | 277/3 |
| 3,075,780 | 1/1963 | Mayer | 277/59 |
| 3,127,181 | 3/1964 | Crego et al. | 277/3 |
| 3,148,887 | 9/1964 | List | 277/65 |
| 3,724,861 | 4/1973 | Lesiecki | 277/25 |
| 3,740,057 | 6/1973 | Doyle et al. | 277/59 |
| 3,762,724 | 10/1973 | Porter | 277/21 |
| 3,837,659 | 9/1974 | Moncrief | 277/74 |
| 3,863,935 | 2/1975 | Batch | 277/65 |
| 4,023,648 | 5/1977 | Orlitzky et al. | 184/39 |
| 4,632,402 | 12/1986 | Daeyaert | 277/15 |
| 4,671,386 | 6/1987 | Orlitzky | 184/39 |
| 4,821,799 | 4/1989 | Wong | 277/72 FM |
| 4,881,829 | 11/1989 | Koelsch | 384/448 |
| 4,984,811 | 1/1991 | Kuwabara et al. | 277/59 |
| 5,277,489 | 1/1994 | Hamm | 366/2 |

OTHER PUBLICATIONS

Brochure by PLI, Inc., "Electro–Luber" (4 pages).

*Primary Examiner*—Randolph A. Reese
*Assistant Examiner*—John L. Beres
*Attorney, Agent, or Firm*—Flynn, Thiel, Boutell & Tanis, P.C.

[57] ABSTRACT

A mechanical seal assembly for creating a sealing relationship between a housing and a shaft which is rotatable relative thereto. The seal assembly includes first and second coaxially aligned and axially adjacent seal rings disposed in an encircling relationship to the shaft and having axially adjacent and opposed flat seal faces for creating an annular sealing region therebetween. The seal assembly further includes a self-contained grease supply device for supplying a continuous flow of grease to a seal chamber at a substantially steady or uniform flow rate and a grease discharge device for pressurizing the grease and permitting a flow of excess grease therethrough. The pressurized grease is positioned adjacent the seal rings to provide a self-regulating supply of grease which is drawn into the sealing region during upset conditions of the seal.

20 Claims, 2 Drawing Sheets

GREASE SEAL

FIELD OF THE INVENTION

This invention relates to a mechanical seal and, more particularly, a grease-lubricated mechanical seal preferably for use with slurries and other abrasive process fluids.

BACKGROUND OF THE INVENTION

Mechanical seal assemblies are used extensively in rotating equipment to create a sealed relationship between a process fluid housing and a shaft which is rotatable relative thereto. The mechanical seal assembly typically includes a pair of annular seal rings which are respectively sealingly and nonrotatably coupled to the shaft and housing, and which have opposed flat seal faces which are normally urged toward one another to create a substantially sealed relationship between an inboard process fluid chamber disposed adjacent one radial edge of the seal faces, and an outboard side of the seal rings disposed adjacent the other radial edge thereof. To effect sealing, face contact pressure between the seal faces is generated by a spring acting upon a back surface of one of the seal rings which provides a closing force to bias the one seal ring towards the other and prevent or minimize leakage of process fluid.

In one seal arrangement commonly referred to as a single seal, a single pair of seal rings is used to seal the process fluid. In such an arrangement, however, heat is generated by seal face contact and viscous shearing of the process fluid during rotation of the shaft. During normal operating conditions, this heat is effectively dissipated by the process fluid. However, during upset conditions, such as a loss or cavitation of the process fluid, the heat dissipative effect of the process fluid may be reduced or not be present such that overheating of the seal rings occurs which can result in excessive wear and seal failure. Such upset conditions can occur frequently when unloading fluids such as slurries from storage tanks or the like or when moving slurries for example in the mining industry.

To accommodate upset conditions, it is also known to provide an outboard second seal such as a second pair of seal rings or an alternative seal device such as a lip seal. The second seal is axially spaced from the inboard pair of seal rings to define a seal chamber therebetween. A buffer or quench fluid is circulated within the seal chamber to flush the seal chamber during normal operation and also dissipate heat, in particular, during upset conditions. This fluid may, for example, be oil or water which is circulated through inlet and outlet ports which communicate with the seal chamber.

In such an arrangement, the quench fluid typically is supplied by a relatively complex arrangement of piping and additional components which can include a make-up tank which compensates for fluid losses and a cooling system to maintain the fluid temperature below a boiling point thereof. However, these systems are of increased complexity and have increased costs associated therewith.

Since the above-described seal arrangement typically is more expensive, and may not be cost effective for particular uses, seal chambers, as defined between the inboard seal rings and the spaced apart lip seal, have also been packed with additional grease being supplied by a grease cup or grease fitting which is spring-loaded to supply grease to the seal chamber for lubrication of the seal rings. These grease cups or fittings, however, require manual refilling at relatively short intervals since the supply of grease in the grease cup or grease fitting is limited. Additionally, the system typically results in a maximum flow of grease after the addition of the grease when the spring load is highest followed by a corresponding drop in the grease flow during the time span between refills as the volume of grease decreases and the spring load decreases substantially to a zero load. Still further, any process fluid which migrates across the seal faces into the seal chamber contaminates the grease and continues to build up in the seal chamber.

In view of the foregoing, it is an object of the invention to provide a mechanical seal arrangement which is particularly suitable for sealing abrasive process fluids such as slurries and readily accommodates upset conditions which can frequently occur during the unloading of storage tanks. It is an object that this seal arrangement utilize a lubricant such as oil and preferably a high viscosity lubricant such as grease in a seal chamber thereof which is maintained at a low pressure level which is less than the process fluid pressure. It is a further object that grease supply and grease discharge devices be provided for automatic injection of grease into the seal chamber and automatic control of the grease pressure therein. In particular, it is still a further object that the grease supply and discharge devices be relatively non-complex and of low cost.

To satisfy the above objects of the invention, the mechanical seal assembly of the invention includes an inboard primary seal which includes opposed seal rings that seal a process fluid chamber of a pump or mixer housing from a seal chamber defined by the mechanical seal assembly. The seal rings are disposed closely adjacent one another in an opposed sealing relationship to seal a process fluid contained within the process fluid chamber from leaking into the seal chamber. The seal further includes an outboard secondary seal which is spaced axially from the seal rings of the primary seal to define the seal chamber therebetween. The secondary seal preferably is a lip seal sealingly connected to the shaft so as to isolate the seal chamber from atmospheric pressure located on the exterior of the seal assembly. Grease is supplied to the seal chamber by a grease supply assembly and is pressurized. Preferably the grease supply assembly is an automatic grease dispenser which continuously feeds a flow of grease into the seal chamber at a steady or uniform flow rate such that the grease flows into the seal chamber and adjacent the seal rings. The discharge assembly preferably is a pressure relief valve which thereby maintains the grease in the seal chamber pressurized, preferably between about one and 10 psi, and in particular, about 5 psi while permitting the grease to flow out of the seal chamber to flush contaminants and wear debris.

During upset conditions, the pressurized grease is able to flow between the seal rings of the primary seal to lubricate the seal faces and reduce heat generation. In particular, by using grease, the grease is believed to become less viscous as the temperature of the seal faces increases so as to be pushed between the seal faces by the pressure thereof and/or be drawn or ingested between the seal faces for lubrication thereof. The grease thereby reduces the seal face temperature. As the grease between the seal faces is used up or drawn into the process fluid chamber, the temperature again begins to rise and more grease is drawn between the seal faces. Thus, the seal effects self-regulation of the temperature of the seal faces during upset conditions without the necessity of complex support systems or the like.

Other objects and purposes of the invention will be apparent to persons familiar with seal assemblies of this general type upon reading the following specification and inspecting the accompanying drawings.

Figure 1:
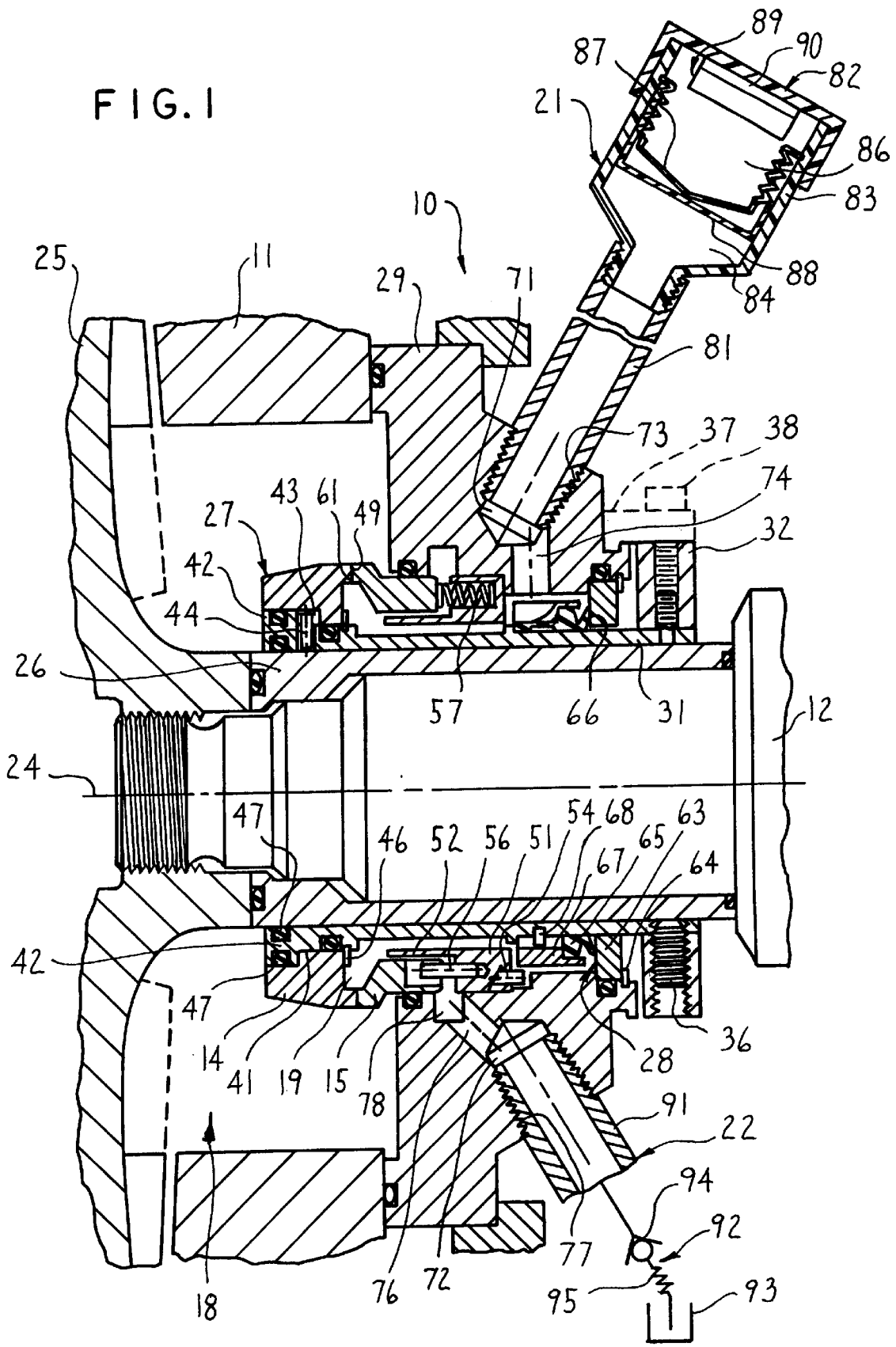
FIG. 1 is a partial side elevational view in cross section of a mechanical seal assembly according to the invention mounted on a rotatable shaft.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
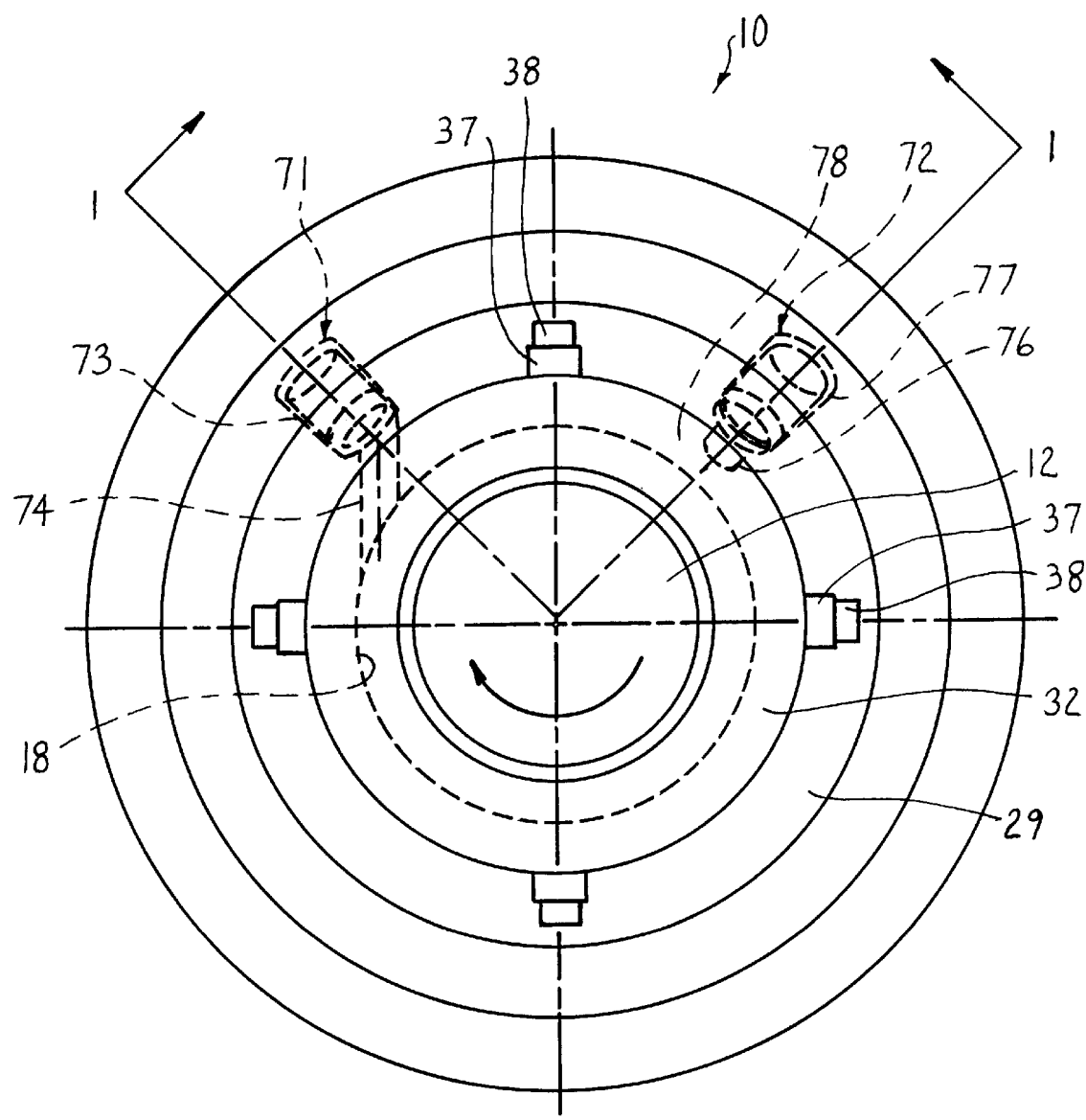
FIG. 2 is an end elevational view of the mechanical seal assembly.

Referring to FIGS. 1 and 2, the invention relates to a mechanical seal assembly 10 which cooperates between a process fluid housing 11 and a rotatable shaft 12. The mechanical seal 10 includes opposed seal rings 14 and 15 which are disposed closely adjacent one another in an opposed sealing relationship to seal a process fluid contained within a housing chamber 18 from leaking into a seal chamber 19 defined within the seal assembly 10. Further, the seal assembly 10 includes an automatic lubricant or grease supply assembly 21 and a lubricant or grease discharge assembly 22 both in communication with the seal chamber 19 so as to provide a self-regulating supply of pressurized lubricant, preferably grease to the seal faces. The seal assembly 10 thereby is particularly suited for sealing abrasive process fluids such as slurries and uses a minimal number of component parts while accommodating upset conditions.

More particularly, the rotatable shaft 12 is a driven component of rotatable equipment (not illustrated), such as a pump or mixer or other similar equipment, with the shaft 12 being driven from the illustrated rightward side or end thereof so as to rotate about a longitudinal axis 24 thereof. The leftward end of the shaft 12 extends into the housing chamber 18 and is operatively connected, for example in the case of a pump, to an impeller 25 or other similar driven component. The impeller 25 thereby is rotated by the shaft 12 to effect pumping of the process fluid through the pump housing 11. Additionally, a cylindrical interior sleeve 26 is positioned over the shaft 12 to seal the impeller connection and effectively define an outer peripheral surface of the shaft 12.

For purposes of discussion, the following will describe the application of the seal 10 to the pump although the seal 10 also can be applied to other rotating equipment such as mixers or the like. The specific arrangement of the pump and the use of mechanical seals to seal process fluids is known to the skilled artisan, and accordingly a detailed discussion of the pump housing and related structures is not required for a full appreciation of the inventive mechanical seal 10 discussed in more detail hereafter.

The mechanical seal 10 generally includes an inboard primary seal 27 defined by the seal rings 14 and 15 which may be of silicon carbide and are disposed in sealing engagement one with the other, and an outboard secondary seal 28 which is spaced axially from the seal rings 14 and 15 to define the seal chamber 19 therebetween. The secondary seal 28 is sealingly connected to the shaft 12 so as to isolate the seal chamber 19 from atmospheric pressure located exteriorly of the seal 10. A lubricant and preferably, a high viscosity lubricant such as grease, is supplied to the seal chamber 19 by the supply assembly 21 to lubricate the seal rings 14 and 15 during upset conditions and preferably is pressurized and allowed to flow through and out of the seal chamber 19 by the discharge assembly 22. The preferred grease for use in sealing slurries encountered in the mining industry has a drop point of 300° F.

More particularly, the seal 10 includes a seal housing having a gland member 29 which has an annular shape and is disposed coaxially about the rotatable shaft 12. The gland member 29 is removably fastened to the pump housing 11 using conventional fasteners (not illustrated) such that the gland member 29 is non-rotatably fixed in position relative to the housing 11 and the rotatable shaft 12. The gland member 29 has an inside diameter greater than the outside diameter of the shaft 12 such that the gland member 29 is spaced radially outwardly from the shaft 12.

In the radial space between the shaft 12 and the gland member 29, a hollow cylindrical shaft sleeve 31 is received coaxially over the outer peripheral surface of the shaft 12 in sealing engagement therewith to prevent migration of the process fluid between interfacing surfaces of the shaft sleeve 31 and the interior sleeve 26. The shaft sleeve 31 is nonrotatably secured to the shaft 12 by a compression fit so as to rotate in combination with the shaft 12.

An annular collar 32 is slidably received over the rightward outboard end of the shaft sleeve 31, and a set screw 36 is driven radially inwards through the sleeve collar 32 and the sleeve 31 to effect a radially inwardly directed compression force onto the interior sleeve 26 which serves to secure the shaft sleeve 31 onto the shaft 12. Once the shaft sleeve 31 is secured in place, conventional retainer plates 37 and bolts 38 are thereafter removed to disengage and permit rotation of the shaft sleeve 31 relative to the gland member 29 during seal operation.

The shaft sleeve 31 also includes a seal ring seat 41 on the inboard end thereof which is defined by a radially outwardly projecting backing flange 42. The seal ring 14 commonly referred to as a rotor is positioned on and nonrotatably coupled to the seat 41 so as to rotate in conjunction with the shaft 12. To effect driven rotation of the seal ring 14 during shaft rotation, the seal ring 14 includes radially inwardly opening drive notches 43 spaced circumferentially about an inner peripheral surface thereof which each receive a drive pin 44 therein. Each drive pin 44 is fixed to the sleeve 31 and projects radially therefrom.

To prevent axial movement of the seal ring 14 relative to the sleeve 31, the seal ring 14 axially abuts on one side against the backing flange 42 and is restrained on its opposite side by an annular retaining ring 46 which is seated within a corresponding annular channel of the sleeve 31. Additionally, elastomeric o-rings 47 are confined in seat 41 to prevent migration of process fluid therepast.

The seal ring 14 defines a sealing region between the housing chamber 18 and the seal chamber 19 by an annular seal face 49 which extends across a radial portion of the seal ring 14. The seal face 49 is substantially flat and faces axially along the shaft 12 towards the driven end thereof for sealing engagement with the opposing seal ring 15 so as to define an annular sealing region therebetween with the housing chamber 18 and the seal chamber 19 being disposed at opposite radial edges of the sealing region.

To position the stationary seal ring 15 in opposing relation with the rotatable seal ring 14, the seal housing includes a hollow cylindrical shroud or sleeve 51 which is disposed within the seal chamber 19. More particularly, the shroud 51 has an end mounting portion disposed in an interfacing relation with the inner peripheral surface of the gland member 29 and includes an annular rim 52 extending axially away from the end mounting portion toward the seal ring 14. The annular rim 52 of the shroud 51 is oriented substantially parallel with and radially spaced from the inner peripheral surface of the gland 29 so as to define an annular space therebetween in which the seal ring 15 is slidably seated as described herein.

The shroud 51 is non-rotatably connected to the gland 29 by an axially projecting pin 54, the opposite ends of which engage corresponding notches formed in opposing faces of the shroud 51 and the gland 29. The shroud 51 further includes at least one additional pin 56 and a plurality of circumferentially spaced coil springs 57. The springs 57 are seated within corresponding blind bores of the shroud 51 and project axially toward a back face of the seal ring 15.

At least a back end of the seal ring 15 is slidably received within the annular space formed between the annular rim 52 of the shroud 51 and the opposing annular surface of the gland member 29 and is sealingly engaged with the gland 29 by an elastomeric O-ring or the like. While the seal ring 15 is axially movable, the seal ring 15 is nonrotatably coupled to the gland member 29 by the pin 56 which is fixedly secured to and projects axially from the shroud 51. Further, the coil springs 57 act on the back face of the seal ring 15 to provide a generally axially directed closing force which biases the axially movable seal ring 15 toward the seal ring 14.

The seal ring 15, similar to the seal ring 14, includes a seal face 61 which is disposed in an opposing relation with the seal face 49 of the corresponding seal ring 14 so as to create the annular sealing region between the opposing seal faces 49 and 61. The seal faces 49 and 61 thereby effect sealing between the housing chamber 18 and the seal chamber 19 which are disposed at the respective radially outer and inner edges of the sealing region. In the illustrated embodiment, the seal faces 49 and 61 typically are in contact during operation. While such contact generates heat due to friction as well as viscous shearing of the process fluid, the flow of the process fluid through the housing chamber 18 during shaft rotation serves to dissipate heat from the seal faces 49 and 61. However, during upset conditions, such as cavitation or loss of the process fluid which can occur frequently during the pumping of slurries or the unloading of storage tanks, the heat dissipating effect of the process fluid is significantly diminished which is compensated for by the grease in the seal chamber 19.

To define the seal chamber 19, the secondary seal 28 is spaced axially from the seal rings 14 and 15 of the primary seal and is disposed proximate the outboard end of the shaft sleeve 31. The secondary seal 28 effectively separates and seals the seal chamber 19 from the exterior of the mechanical seal 10. This secondary seal 28 preferably is a lip seal arrangement which is sealingly connected between the gland 29 and the sleeve 31.

In particular, the secondary seal 28 includes an annular silicon carbide sealing disc 63 which is engaged with the inner peripheral surface of the gland member 29 where an elastomeric O-ring is disposed therebetween. The sealing disc 63 is axially restrained on one side by a step formed in the gland 29 and on the other side by a retaining ring 64 projecting radially inwardly from the gland member 29. The sealing disc 63 thereby is effectively non-rotatably connected to the gland member 29.

The secondary seal 28 further includes an elastomeric annular lip seal 65 which is sealingly and tight fittingly engaged with the outer peripheral surface of the sleeve 31. The lip seal 65 includes a resilient annular flange 66 which projects radially outwardly and rearwardly so as to abut against the sealing disc 63 and thereby separate the seal chamber 19 from the exterior. Such lip seals 66 are of conventional construction and thus, further disclosure with respect thereto is not believed necessary.

Additionally, an annular ring 67 is positioned in concentric surrounding relation to the lip seal 66 to further secure the lip seal 66 to the shaft sleeve 18. The ring 67 is fixedly secured to the shaft sleeve 31 by a radially projecting pin 68 which engages an inward opening notch of the ring 67.

To supply the grease to the seal chamber 19, an inlet port 71 and an outlet port 72 are formed through the gland member 29 in communication with the seal chamber 19. The inlet port 71 includes a threaded opening or seat 73 which opens to the exterior of the seal assembly 10 and is adapted to be threadedly engaged with the grease supply assembly 21. The threaded seat 73 is in communication with an inlet bore 74 which extends generally radially inwardly although the bore 74 extends at an angle relative to the threaded seat 73 as seen in FIG. 2 so as to enter the seal chamber 19 generally tangentially to the outer peripheral surface thereof and facilitate circulation of the grease throughout the entire seal chamber 19. The bore 74 preferably is located in the region proximate the ring 67 such that the grease flows along a first flow path past the ring 67 to the seal rings 14 and 15.

The outlet port 72 is similar to the inlet port 71 and in particular, includes an exit bore 76 which projects radially from said seal chamber 19 to a threaded outlet opening or seat 77 which is threaded for engagement with the grease discharge assembly 22. The exit bore 76 opens into the seal chamber 19 and preferably into an annular channel 78 formed in the gland member 29 in the region behind the back face of the seal ring 15 whereby the grease is able to flow along the second flow path from the region proximate the seal rings 14 and 15 and through a radial space between the seal ring 15 and the shroud 51. As seen in FIG. 2, the exit bore 76 and outlet seat 77 project radially from the shaft axis 24 to facilitate discharge of the grease from the seal chamber 19. The first and second flow paths are in communication with each other in the region of the seal rings 14 and 15, and the annular rim 52 of the shroud 51 separates the first and second flow paths away from said seal rings.

To inject grease into the seal chamber 19, the grease supply assembly 21 is connected to the inlet port 71 and in particular, includes a rigid inlet pipe 81 that has male threads at one end which are threadedly engaged with the inlet seat 73 and female threads at the opposite end. The inlet pipe 81 projects outwardly of the gland member 29 to the exterior thereof and preferably has a self-contained automatic grease supply device 82 threadedly engaged thereto so as to be supported by the gland member 29. The grease supply device 82 contains a predetermined volume of a grease supply and operates to provide a substantially steady or uniform flow rate of grease into the seal chamber 19.

The grease supply device 82 in the preferred embodiment is a commercially available automatic lubricator sold by PLI, Inc. of Racine, Wis. under the trademark ELECTROLUBE. FIGS. 1 and 2 diagrammatically illustrate the primary components of the grease supply device 82 which are generally described and operate as described below. A more detailed description of the grease supply device 82, however, is not believed necessary for an understanding of the invention described herein.

The grease supply device 82 includes a hollow outer housing or container 83 which is divided into two chambers 84 and 86 by a flexible elastomeric bellows 87. The first chamber 84 defines a grease reservoir which communicates with the inlet pipe 81 and stores a predetermined volume of grease therein. This chamber 84 further includes a pressurizing piston 88 slidably received therein for driving the grease out of the reservoir. More particularly, the piston 88 has a front face actable on the grease and a back face adjacent to the bellows 87 so that said bellows 87 moves in combination with the piston 88.

The second chamber 86 is a hermetically sealed gas chamber. To drive the piston 88, actuation means 89 are disposed within the second chamber 86 so as to effect axial movement of the piston 88 and drive the grease out of the reservoir and through the inlet pipe 81 at a substantially steady or uniform flow rate. In the preferred commercially available grease supply device 82, the actuation means 89 includes a 1.5 volt battery and an electrochemical cell and electrolyte operatively connected to the battery. When an electrical current is supplied from the battery to the electrochemical cell, the electrochemical cell is activated to begin an electro-chemical reaction whereby the electrical energy is converted into nitrogen gas. As the current continues, the pressure of the gas within the gas chamber 86 continues to increase which thereby acts upon the back face of the piston 88 and causes a substantially continuous flow of grease out of the grease reservoir 84 to occur.

In this grease supply device 82, the amount of gas and thereby the flow rate of the grease is directly related to the amount of electrical current being applied. In view thereof, the grease supply device 82 includes a control circuit 90 which includes a plurality of switches to set the current being applied. Thus, the flow rate is settable, and preferably is set between 0.17 to 1.33 cubic centimeters of grease per day for a pump being used on slurries. To maximize the time period before the grease supply device 82 needs to be replaced once the grease supply is exhausted, the flow rate preferably is set as low as possible although this rate will vary from application to application and should be greater than the amount of grease flowing between the seal faces during upset conditions.

In this manner, an approximately constant flow of grease is supplied to the seal chamber 19. This grease flows through the seal chamber 19 and, in particular, flows to the region adjacent the seal rings 14 and 15. Thus, the grease supply device 82 is a self-contained grease dispenser which provides an automatic injection of grease at a steady or uniform flow rate over an extended period of time. For example, the preferred commercially available grease supply device 82 will last about 720 days when the flow rate is 0.17 cc's/day and about 90 days when the flow rate is 1.33 cc's/day.

The seal 10 further includes the seal discharge assembly 22 which is connected to the outlet port 72 to provide a controlled discharge of grease therefrom and, in particular, includes a rigid outlet pipe 91 that has male threads at one end which are threadedly engaged with the outlet opening 77 and female threads at the opposite end. At this opposite end, the seal discharge assembly 22 further includes a relief valve 92 that discharges into a waste receptacle 93 and is effectively supported by the gland member 29. Preferably the relief value 92 is a spring-loaded check valve 94 of conventional construction. The check valve 94 normally is closed until such time as the pressure of the grease in the seal chamber 19 reaches a predetermined pressure level due to the constant flow rate of the grease supply, whereby the load of a spring 95 acting on the check valve 94 is overcome and the relief valve 92 opens to allow discharge of grease therethrough. The relief valve 92 opens between one and 10 psi and preferably about five psi and thereby serves to pressurize the grease within the seal chamber 19 at a predetermined pressure level. Since the grease supply device 82 provides a continuous flow of grease to the seal chamber, the relief valve 92 will continuously control the pressure of the seal chamber 19 by opening once the grease exceeds the threshold pressure level. Thus, grease is able to flow out of the seal chamber 19.

Once the grease is discharged, the grease passes downstream through further piping to the waste receptacle 93. Since the discharged grease typically will be contaminated or diluted by a small amount of product which may leak through the seal rings 14 and 15 as well as by wear debris from the seal rings 14 and 15, the waste receptacle 93 preferably is provided instead of an alternate arrangement whereby the grease is routed through a closed loop back to the grease reservoir of the grease supply device 82.

The pressure of the grease within the seal chamber 19 preferably is maintained at least with a minimal pressure so that the grease tends to flow throughout the entire seal chamber 19 and in particular, to the area adjacent to the sealing region between the seal rings 14 and 15. The pressure, however, should not be so great such that the grease tends to flow between the seal rings 14 and 15 during normal operation of the pump or other rotating equipment. Rather, the grease is not effective until such time as upset conditions occur, such as pump cavitation or loss of process fluid where the heat dissipating effect of the process fluid is significantly reduced.

In particular, a minimal amount of process fluid typically migrates across the seal faces during operation to resist the flow of lubricant between the seal faces while the increased viscosity of the lubricant particularly for grease also tends to prevent the flow of grease into the seal faces. During upset conditions, however, when the process fluid pressure is lost, the temperature of the seal rings 14 and 15 tends to increase due to the increased contact of the seal faces 49 and 61 which thereby heats the grease above the drop point thereof and reduces the viscosity thereof. At such time, the grease is believed to flow into the seal faces 49 and 61 either by being pushed into the seal faces 49 and 61 by the pressure of the grease, and/or is wicked or drawn between the seal faces by surface tension or centrifugal forces occurring during shaft rotation. Thus, lubrication of the faces 49 and 61 is improved such that the temperature of the seal faces 49 and 61 is lowered. The viscosity of the grease is then believed to increase due to the reduction in temperature such that the flow of grease into the seal faces 49 and 61 is reduced until the grease present between the seal faces 49 and 61 is consumed or expelled therefrom. At this time, the temperature then begins to rise again which thereby repeats the process of reducing the viscosity of the grease, which grease is fed into the sealing region. The flow of grease into the sealing region thereby cycles in response to the seal face temperature which serves to self-regulate the lubrication of the seal faces 49 and 61 without separate and independent external control circuits or devices.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a mechanical seal assembly for creating a sealing relationship between a housing and a shaft rotatable relative thereto, said seal assembly including a seal chamber defined radially between said shaft and an interior surface of said housing and first and second coaxially aligned seal rings disposed in axially adjacent and surrounding relationship to the shaft, said first and second seal rings having opposed flat seal faces thereon which are normally maintained in directly opposed and close association with one another to define an annular sealing region therebetween to effectively separate a process fluid disposed in a housing chamber of said housing from said seal chamber, said housing chamber and said seal chamber being defined at opposite radial edges of said annular sealing region, said first seal ring being nonrotatably coupled to the housing, said second seal ring being nonrotatably coupled to said shaft so as to rotate in combination with the shaft, said seal assembly including secondary seal means which are axially spaced from said first and second seal rings for defining said seal chamber therebetween, and an inlet port and an outlet port each in communication with said seal chamber, comprising the improvement wherein said inlet port opens into said seal chamber in the region between said secondary seal means and said first and second seal rings, said seal assembly including grease supply means connected to said inlet port for supplying a flow of grease into said seal chamber, said grease flowing to said seal rings along a first flow path which extends axially through said seal chamber between said inlet port and said radial edge of said sealing region disposed in said seal chamber, and grease discharge means connected to said outlet port for permitting a flow of said grease out of said seal chamber along a second flow path, said second flow path being defined by said housing and extending between said radial edge of said sealing region disposed in said seal chamber and said outlet port, said housing separating said first flow path from said second flow path while permitting said grease to flow from said first flow path to said second flow path proximate said seal rings, said grease within said seal chamber being pressurized by said grease supply means and said grease discharge means at a positive pressure level which is less than a process fluid pressure of said process fluid within said housing chamber, said grease being substantially non-flowable into said sealing region when said process fluid is disposed in said housing chamber and being flowable into said sealing region upon a loss of said process fluid so as to lubricate said seal faces.

2. A mechanical seal assembly according to claim 1, wherein said grease supply means includes a grease supply and drive means actable on said grease supply for providing a flow of said grease through said inlet port at a substantially steady flow rate into said seal chamber.

3. A mechanical seal assembly according to claim 2, wherein said grease supply means includes a hollow container in which said grease supply is disposed, said drive means including a piston slidably disposed within said container and actuation means connected to said piston for driving said piston within said container to force said grease through said inlet port.

4. A mechanical seal assembly according to claim 2, wherein said flow rate is in the range between 0.17 cc/day and 1.3 cc/day.

5. A mechanical seal assembly according to claim 1, wherein said grease discharge means comprises a normally closed relief valve which is openable when said grease within said seal chamber exceeds said pressure level.

6. A mechanical seal assembly according to claim 5, wherein said pressure level of said grease within said seal chamber is in the range of between about one and 10 psi.

7. A mechanical seal assembly according to claim 1, wherein said secondary seal means comprises a lip seal arrangement axially spaced from said first and second seal rings to define said seal chamber therebetween.

8. A mechanical seal assembly according to claim 1, wherein said mechanical seal assembly includes an annular member which is connected to said housing and defines said seal chamber and said inlet port and said outlet port, said grease supply means including a hollow housing which is supported by said annular member and includes a supply of said grease therein, said grease discharge means comprising a relief valve which is connected to and supported by said annular member.

9. A mechanical seal assembly according to claim 8, wherein said annular member defines an annular chamber which opens forwardly and receives a back end of said first seal ring therein, a radial space being defined between opposing circumferential surfaces of said first seal ring and a side wall of said annular chamber, said outlet port communicating with said annular chamber and said second flow path extending axially away from said seal faces through said radial space and into said annular chamber so as to be in communication with said outlet port.

10. A mechanical seal assembly according to claim 9, wherein said outlet port is disposed adjacent said back end of said first seal ring which is contained within said annular chamber.

11. A mechanical seal assembly according to claim 10, wherein said first flow path extends along said shaft and said second flow path is defined by said housing radially outwardly of said first flow path.

12. In a mechanical seal assembly for creating a sealing relationship between a housing and a shaft rotatable relative thereto, said seal assembly including a seal chamber and first and second coaxially aligned seal rings disposed in axially adjacent and surrounding relationship to the shaft, said first and second seal rings having opposed flat seal faces thereon which are normally maintained in directly opposed and close association with one another to define an annular sealing region therebetween to effectively separate a process fluid disposed in a housing chamber of said housing from said seal chamber, said housing chamber and said seal chamber being defined at opposite radial edges of said annular sealing region, said first seal ring being nonrotatably coupled to the housing, said second seal ring being nonrotatably coupled to said shaft so as to rotate in combination with the shaft, said seal assembly including secondary seal means which are axially spaced from said first and second seal rings for defining said seal chamber, and an inlet port and an outlet port each in communication with said seal chamber, comprising the improvement wherein said seal assembly includes self-contained grease supply means connected to said inlet port for supplying a flow of grease at a substantially uniform flow rate into said seal chamber and adjacent said radial edge of said sealing region disposed in said seal region, and grease discharge means connected to said outlet port for permitting a flow of said grease out of said seal chamber when said grease is at a threshold pressure level so that said grease in said seal chamber is pressurized thereby at a grease pressure level, said grease discharge means being free of connections with said grease supply means, said grease pressure level being substantially lower than a process fluid pressure level and being in the range between about one and 10 psi.

13. A mechanical seal assembly according to claim 12, wherein said flow rate is in the range between 0.17 cc/day and 1.3 cc/day.

14. A mechanical seal assembly according to claim 12, wherein said mechanical seal assembly includes an annular member which defines said seal chamber and said inlet port and said outlet port, said grease supply means including a hollow container containing a supply of said grease therein which is connected to said inlet port, said grease supply means further including drive means connected to said hollow container for injecting a flow of said grease from said hollow container to said inlet port which thereby flows into said seal chamber.

15. A mechanical seal assembly according to claim 14, wherein said flow rate is sufficient to maintain the seal chamber filled with said grease when said grease is being drawn into the sealing region during a loss of said process fluid from said housing chamber, said grease being substantially non-flowable when said process fluid is disposed in said seal chamber and being flowable into said sealing region upon said loss of said process fluid.

16. A mechanical seal assembly according to claim 12, wherein a first flow path extends axially through said seal chamber between said inlet port and said seal rings, and a second flow path defined by said housing extends between said seal rings and said outlet port, said first and second flow paths being in communication with each other proximate said seal rings and being separated from each other away from said seal rings such that said grease flows toward said seal rings along said first flow path and away from said seal rings along said second flow path.

17. In a mechanical seal assembly for creating a sealing relationship between a process fluid housing and a shaft rotatable relative thereto, said seal assembly including a seal housing which defines a seal chamber and first and second coaxially aligned seal rings disposed in axially adjacent and surrounding relationship to the shaft, said first and second seal rings having opposed flat seal faces thereon which are normally maintained in directly opposed and close association with one another to define an annular sealing region therebetween to effectively separate a process fluid disposed in a housing chamber of said process fluid housing from said seal chamber, said housing chamber and said seal chamber being defined at opposite radial edges of said annular sealing region, said first seal ring being nonrotatably coupled to the seal housing, said second seal ring being nonrotatably coupled to said shaft so as to rotate in combination with the shaft, said seal assembly including secondary seal means which are axially spaced from said first and second seal rings for defining said seal chamber therebetween and include an annular lip seal disposed coaxially about the shaft, said seal housing including an inlet port and an outlet port each in communication with said seal chamber, comprising the improvement wherein said seal assembly includes lubricant supply means connected to said inlet port for supplying a flow of lubricant at a substantially uniform flow rate into said seal chamber along a first flow path extending between said inlet port and said radial edge of said sealing region in said seal chamber, and lubricant discharge means connected to said outlet port for permitting a flow of said lubricant out of said seal chamber along a second flow path when said lubricant is at a threshold pressure level between about 1 to 10 psi, said second flow path being defined by said housing and extending between said radial edge of said sealing region disposed in said seal chamber and said outlet port, said housing separating said first flow path from said second flow path while permitting said lubricant to flow from said first flow path to said second flow path proximate said seal rings, said lubricant supply means including a hollow housing which is connected to said seal housing in communication with said inlet port and contains a supply of said lubricant therein, a piston slidably disposed within said hollow housing and drive means for driving said piston toward said lubricant so that said lubricant flows into said seal chamber, said lubricant discharge means including valve means connected to said seal housing in communication with said outlet port for permitting said flow of said lubricant out of said seal chamber, and pressure setting means connected to said valve means which defines a predetermined pressure level of said lubricant at which said valve means opens for pressurizing said lubricant in said seal chamber, said lubricant being disposed adjacent said sealing rings at said pressure level which remains substantially uniform during a loss of said pressure fluid, said lubricant being substantially non-flowable into said sealing region when said process fluid is disposed in said housing chamber and being flowable into said seal faces during said loss of said process fluid.

18. A mechanical seal assembly according to claim 17, wherein said lubricant is a grease.

19. A mechanical seal assembly according to claim 18, wherein said uniform flow rate is greater than the amount of grease being drawn between said seal faces during a loss of said process fluid such that said seal chamber remains filled with said grease.

20. A mechanical seal assembly according to claim 17, wherein said lubricant is discharged from said valve means to a receptacle, said receptacle being separate from said hollow housing of said lubricant supply means.

* * * * *

UNITED STATES PATENT AND TRADEMARK OFFICE
CERTIFICATE OF CORRECTION

PATENT NO. : 5 803 463
DATED : September 8, 1998
INVENTOR(S) : Clive A. BROOKS et al It is certified that error appears in the above-identified patent and that said Letters Patent is hereby corrected as shown below:

Column 11, line 13; change "seal" to ---housing---.

Signed and Sealed this

Sixth Day of April, 1999

Attest:

Q. TODD DICKINSON

Attesting Officer

Acting Commissioner of Patents and Trademarks